United States Patent [19]
Schuff

[11] 3,758,250
[45] Sept. 11, 1973

[54] TUB FORMING MACHINE

[76] Inventor: Richard William Schuff, 810 W. Glenn Dr., Phoenix, Ariz.

[22] Filed: Aug. 12, 1971

[21] Appl. No.: 171,370

Related U.S. Application Data

[62] Division of Ser. No. 23,584, March 30, 1970, abandoned.

[52] U.S. Cl............... 425/165, 425/409, 425/416, 425/418, 425/422, 425/441, 425/DIG. 817
[51] Int. Cl............................ B29c 3/06, B29d 27/04
[58] Field of Search................... 425/409, 416, 418, 425/422, 450, 449, DIG. 817, 436, 441, 443

[56] References Cited
UNITED STATES PATENTS

| | | | |
|---|---|---|---|
| 3,202,734 | 8/1965 | Young | 425/449 X |
| 3,591,903 | 7/1971 | Bowles | 425/422 X |
| 3,291,875 | 12/1966 | Freedman et al. | 425/817 X |
| 2,332,937 | 10/1943 | Schmidberger | 425/422 |

*Primary Examiner*—J. Spencer Overholser
*Assistant Examiner*—David S. Safran
*Attorney*—Paul R. Wylie

[57] ABSTRACT

A technique, including a method and apparatus, for forming containers from expanded plastic material wherein a male mold member withdraws the formed container from the female mold member and carries the container to a position where it can be removed.

5 Claims, 9 Drawing Figures

INVENTOR.
RICHARD W. SCHUFF
BY
Paul R. Wylie
ATTORNEYS

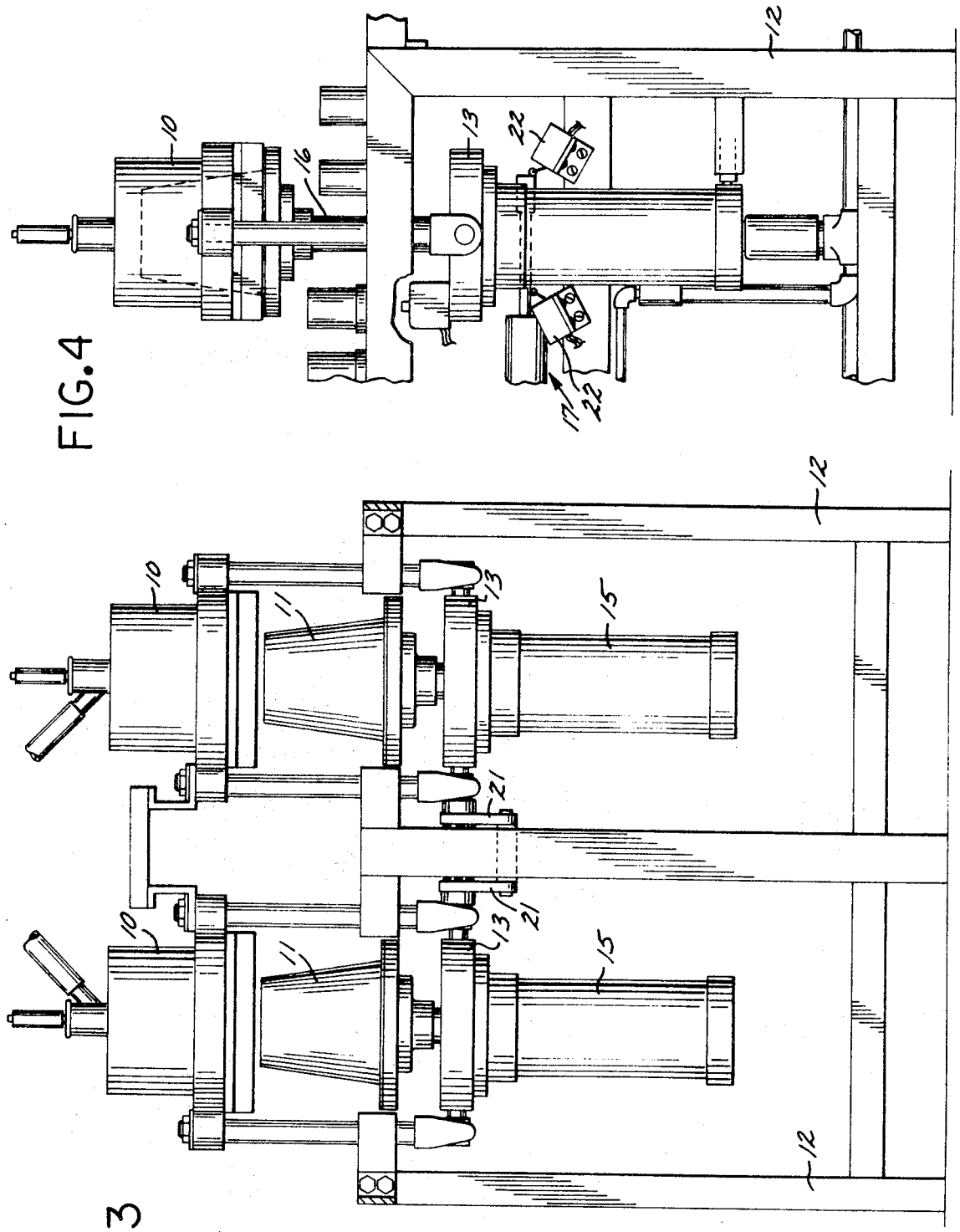

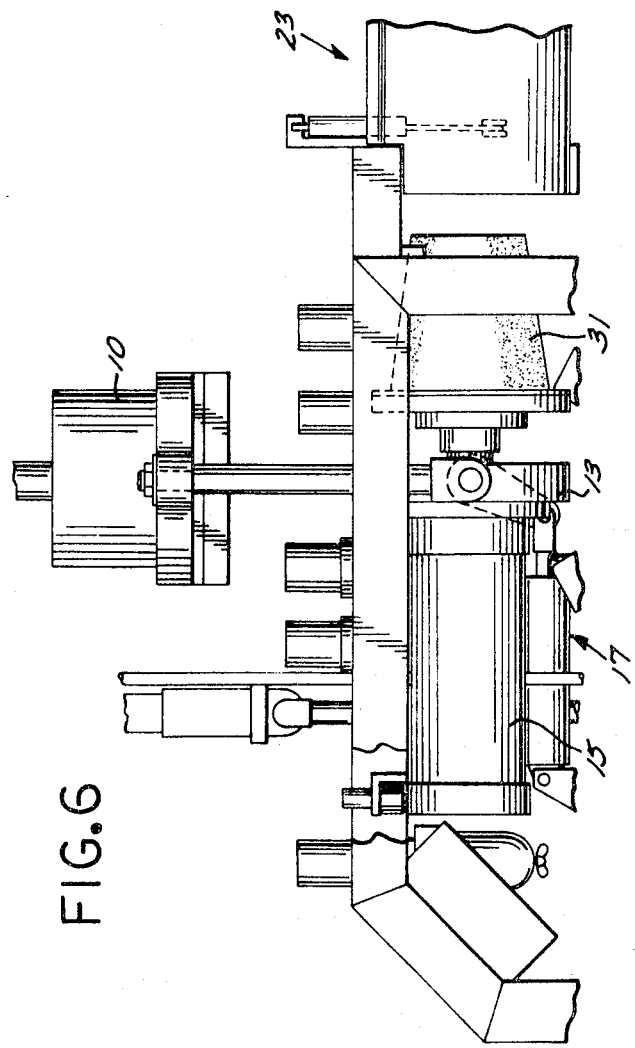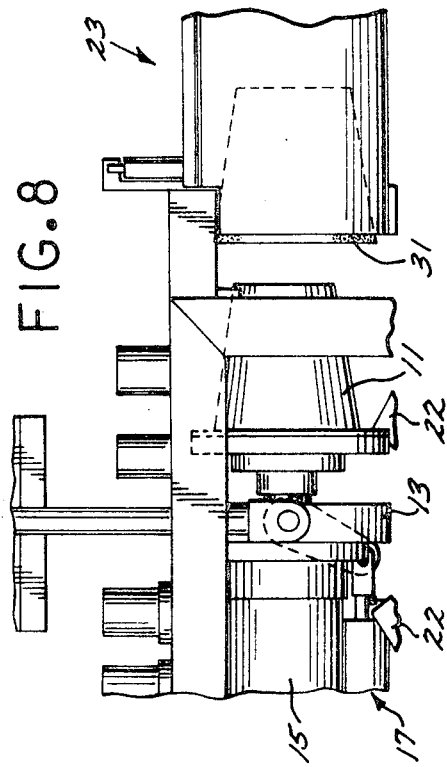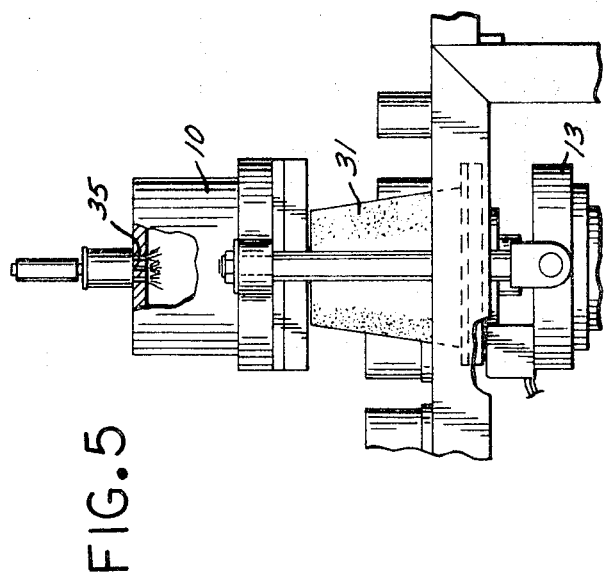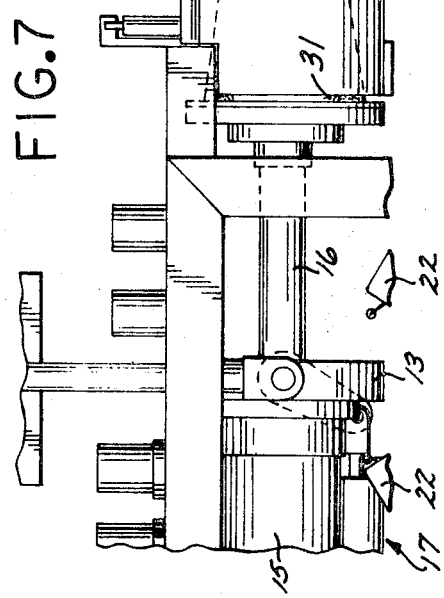

TUB FORMING MACHINE

This is a division of application Ser. No. 23,584 filed Mar. 30, 1970, now abandoned.

This invention generally relates to an apparatus and method for forming containers from expanded plastic material.

More specifically, this invention relates to techniques including apparatus and methods for forming relatively large containers from expanded plastic material.

A feature of this invention is the provision of a stacking chute, adapted to be disposed horizontally, that can be used to receive containers molded by the apparatus and according to the method of the invention.

An object of this invention is the provision of an apparatus for forming relatively large containers.

Another object of this invention is the provision of an apparatus for forming containers from expanded plastic material wherein a mold component can be utilized to transport formed containers to a location where they can be removed from the molding apparatus.

Still another object of the invention is the provision of a stacking chute means which cooperates with a molding apparatus according to the invention while at the same time such chute means can be used independently.

Yet another object of the invention is the provision of a pivotal mold member whereby the mold member can be extended and retracted along two different lines of travel.

These and other objects will be apparent from the accompanying drawings which illustrate a specific embodiment of the invention and wherein:

FIG. 3 is a left side elevational view of the apparatus shown in FIG. 1;

FIG. 4 is a fragmentary elevation view showing the container forming apparatus of FIG. 1 in a position where male and female mold members are in operative relationship to form a mold cavity;

FIG. 5 is a fragmentary view of the apparatus shown in FIG. 1 wherein male and female mold members are shown with a container being carried by the male mold member in a retracted position and wherein part of the female mold member is broken away to show features of the invention;

FIG. 6 is a fragmentary side elevational view showing the male mold member with a container, said mold member and said container being pivoted about an axis;

FIG. 7 is a view similar to FIG. 6 showing the male mold member with the container formed thereon in an extended position;

FIG. 8 is a view similar to FIG. 7 showing the male mold member in a retracted position; and, FIG. 9 is a right-hand end view of the apparatus shown in FIG. 1.

Figure 1:
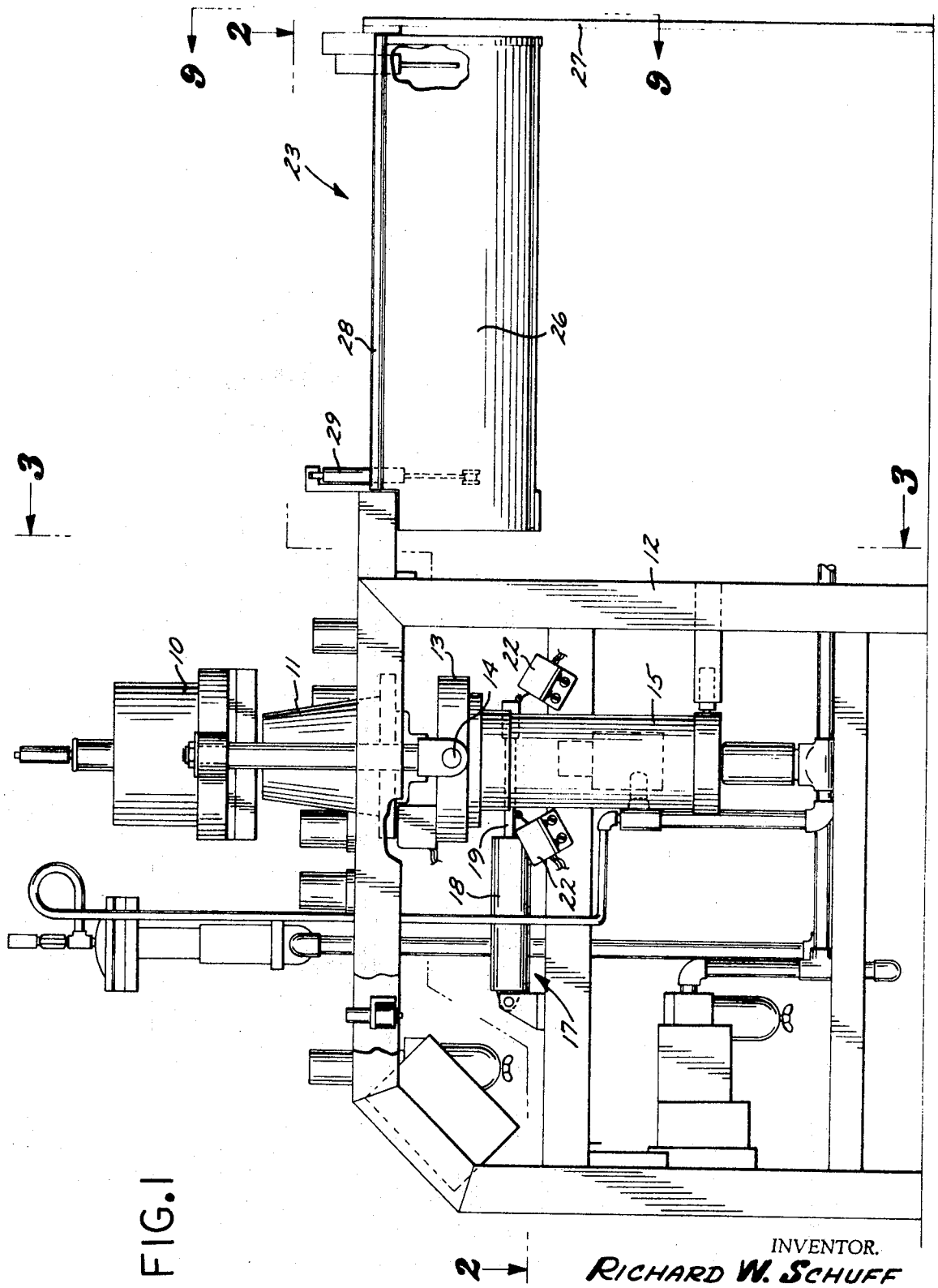
FIG. 1 is a side elevation of the container forming apparatus and stacking means according to the invention.
Figure 2:
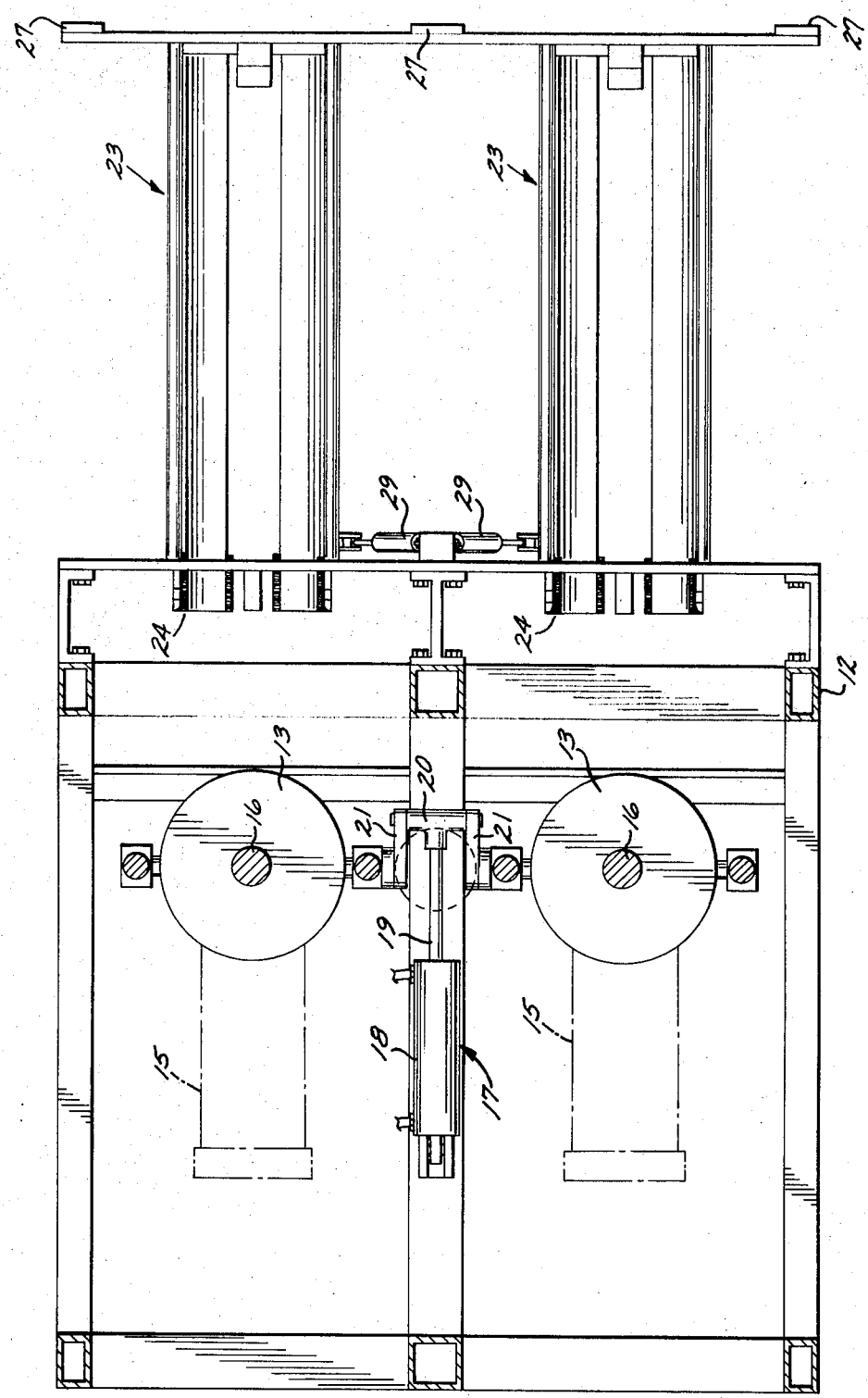
FIG. 2 is a top plan view of the apparatus shown in FIG. 1.
Figure 9:
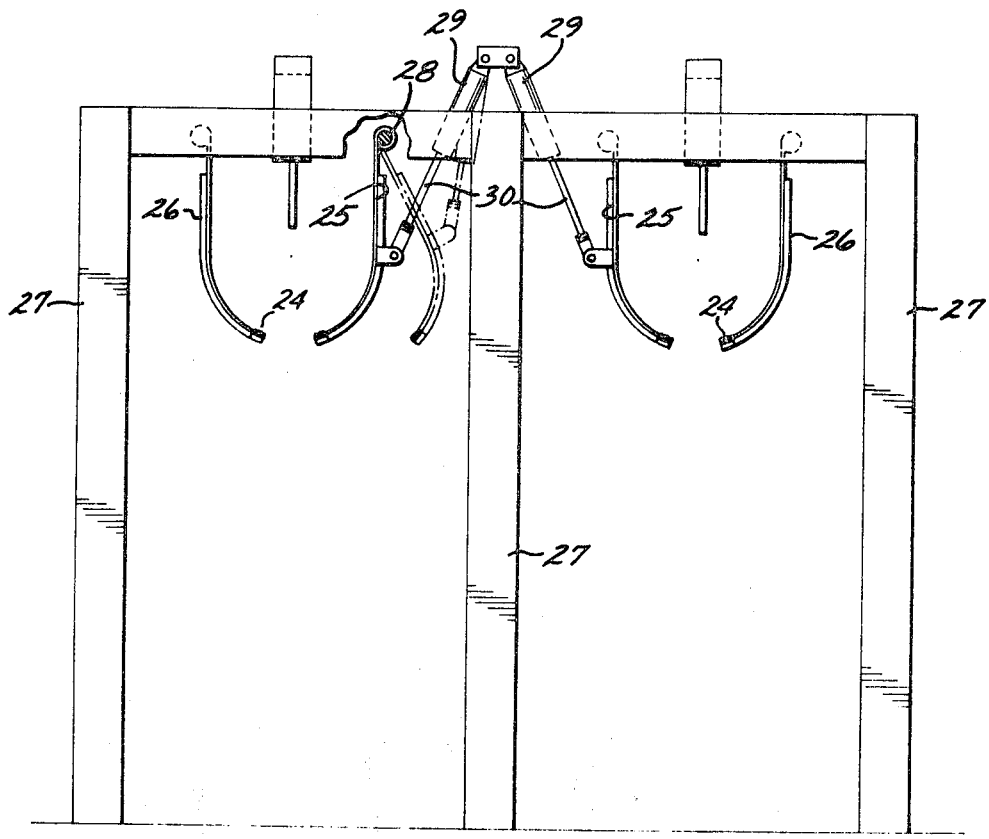

Referring now to the drawings, FIG. 1 shows an apparatus for forming a container including a stationary hollow female mold 10 and a movable male mold 11 which is adapted to form a mold cavity with the female mold. Frame 12 provides a support means for both female mold 10 and male mold 11. Mounting frame 13 is located on support frame 12. Frame 13 is journaled around pivot point 14 whereby the male mold member 11, when in a retracted position (as shown in FIG. 1), can be rotated angularly away from female mold 10. As best seen in FIG. 6, male mold 11 can be rotated with respect to the female mold 10 to a position where it is substantially perpendicular to the female mold center line. Cylinder 15 provides an actuator means for reciprocating male mold 11 along a first line of travel for longitudinal extension and retraction. When the cylinder is in a retracted position, male mold 11 is completely retracted and when piston rod 16 is completely extended out of cylinder 15 the male mold 11 will be extended to form a cavity with female mold 10.

Actuator 17 is operatively positioned to rotate cylinder 15 and male mold 11 about pivot point 14 and includes a cylinder 18 and cylinder rod 19. The cylinder rod is coupled to connector 20 which in turn is journaled with lever arms 21. The lever arms 21 are connected to mounting frame 13. As can be seen in FIGS. 4 through 8, when the cylinder rod 19 is withdrawn into cylinder 18, male mold 11 and cylinder 15 will be pivoted around pivot point 14. Limit switches 22 are provided to control actuator 17.

Stacking means, shown generally as element 23, are provided for the purpose of stacking nested containers and for removing containers from the previously described molding apparatus. As shown, stacking means 23 is formed as an elongate chute positioned at right angles with respect to the female mold member. Frictional means 24, which are preferably in the form of brushes, are provided in the stacking means to retain nested stacked containers therein. The stacking means 23 is comprised of parallel elongate panels 25 and 26. These panels are mounted on frame 27. At least one of the set of parallel elongate panels is longitudinally pivoted around a pivot point 28. The stacking means also includes actuator 29 which is connected by means of actuator rod 30 to panel 25.

As best seen in FIG. 5, pneumatic assist means 35 are provided to aid in the removal of a container from female mold 10. In the simplest form, the pneumatic assist means can be simply the provision of conduits for the introduction of air on the bottom of the container to assure that the container will be removed with the male mold member.

In operation, the apparatus according to the invention works as follows:

FIG. 1 shows the apparatus according to the invention as it is before the start of a molding operation. To form a cavity in which an expanded plastic foamed container can be formed, cylinder 15 is actuated to force male mold 11 upwardly to form a cavity with female mold 10. Means are provided for introducing foamable material into the cavity thus formed, the material is heated, and a container is formed in the cavity.

Since most foamable plastic materials shrink after they are formed, the container 31 will normally be removed from female mold 10 with male mold 11. However, to assure that container 31 goes with male mold 11, pneumatic assist means 35 are provided in the form of an air jet on the bottom of the container.

Once male mold 11 is retracted, actuator 17 is operated and cylinder 15 and male mold 11 carrying container 31 are pivoted around pivot point 14 whereby the longitudinal axis of container 31 and male mold 11 will be substantially longitudinally aligned with stacking means 23, as shown in FIG. 6. Cylinder 15 is then actuated such that male mold 11 and container 31 are inserted into stacking means 23 past friction brushes 24. The male mold is then withdrawn leaving container 31 held by friction brushes 24 in chute 23. The male mold 11 is then rotated back to the position shown in FIG. 1 and the series of steps repeated. As containers 31 are placed in stacking means 23, a stack of such containers in nested relationship is formed. As each container 31 is placed in the stacking means, the stack advances progressively the length of the stacking height of containers. When the chute becomes full of containers, actuator 29 can be operated thus releasing the nested containers to further shipping or storage and leave the chute empty for receipt of additional containers.

The above described apparatus and method are most suitable for forming relatively large foamed plastic containers having height and major diameter dimensions in the order of 10 inches and 6 inches respectively. Preferably the apparatus and method according to the invention can be used for the formation of foamed styrene containers.

The foregoing describes a specific embodiment of the invention. Reasonable modification and variation are permissible within the scope of the following claims.

I claim:

1. An apparatus for forming a container comprising:
   a stationary female mold;
   a container stacking means adjacent said female mold;
   a male mold relatively movable with respect to said female mold and said stacking means;
   reciprocating means for moving said male mold into and out of a mold cavity defining relationship with said female mold;
   actuator means to rotate said reciprocating means angularly away from said female mold including switch means to cause said reciprocating means to move said male mold into and out of said stacking means; and,
   friction means positioned upon said stacking means to retain a container carried upon said male mold when said mold moves into said stacking means.

2. The apparatus of claim 1 wherein said stacking means comprises an elongated chute assembly positioned angularly with respect to said female mold member.

3. The apparatus of claim 1 including means in said female mold to eject a molded container therefrom and assure that such is carried on said male mold when said male mold is retracted from said female mold.

4. The apparatus of claim 3 wherein said means in said female mold to eject a molded container includes means for applying pneumatic pressure to the bottom of said container said means being operated by operator means which supply a current of air when said male mold is moved away from said female mold.

5. The apparatus of claim 2 wherein said chute assembly includes at least two parallel elongate panel members, a frame, and connecting means on said frame for positioning said members whereby one of said members is pivotally connected to said frame for movement away from another of said members to open said chute for the removal of a group of nested containers.

* * * * *